(12) United States Patent
Lust

(10) Patent No.: US 10,908,015 B2
(45) Date of Patent: Feb. 2, 2021

(54) SUPER-RESOLUTION MODAL IMAGING

(71) Applicant: Honeywell International Inc., Morris Plains, NJ (US)

(72) Inventor: Lisa M. Lust, Plymouth, MN (US)

(73) Assignee: Honeywell International Inc., Charlotte, NC (US)

(*) Notice: Subject to any disclaimer, the term of this patent is extended or adjusted under 35 U.S.C. 154(b) by 186 days.

(21) Appl. No.: 16/001,733

(22) Filed: Jun. 6, 2018

(65) Prior Publication Data

US 2019/0376841 A1    Dec. 12, 2019

(51) Int. Cl.
*G01J 1/04* (2006.01)
*G01J 1/42* (2006.01)
*G01J 1/44* (2006.01)

(52) U.S. Cl.
CPC .......... *G01J 1/0407* (2013.01); *G01J 1/4228* (2013.01); *G01J 1/44* (2013.01); *G01J 2001/442* (2013.01); *G01J 2001/4466* (2013.01)

(58) Field of Classification Search
CPC .......... G01J 1/44; G01J 1/0271; B65G 43/00; G01V 8/14
See application file for complete search history.

(56) References Cited

U.S. PATENT DOCUMENTS 3,858,203 A * 12/1974 Constant ............ G06K 7/10861
                                                        342/351
2011/0285995 A1* 11/2011 Tkaczyk ................... G01J 3/02
                                                        356/326

OTHER PUBLICATIONS

Schlangen, et al., "Mode-selective Polished Fiber Couplers Based on Fiber Gratings", 2018 Optical Fiber Communications Conference and Exposition (OFC), OSA, Mar. 11, 2018, 3 pages.
Parniak, et al., "Beating the Rayleigh Limit Using Two-Photon Interference", arxiv.org, Cornell University Library, 201 OLIN Library Cornell University Ithaca, NY 14853, Mar. 19, 2018, 6 pages.
Extended Search Report from related European Application No. 18188380, dated Nov. 20, 2019, 7 pages.

* cited by examiner

*Primary Examiner* — David P Porta
*Assistant Examiner* — Meenakshi S Sahu
(74) *Attorney, Agent, or Firm* — Brooks, Cameron & Huebsch, PLLC

(57) ABSTRACT

Super-resolution modal imaging methods and devices are disclosed herein. One super-resolution modal imaging device includes an optical component provided to receive incoming radiation, a mode separating structure for separating the received incoming radiation into multiple modes, at least one output array, and at least one detector array having multiple array elements for measuring an energy level of each mode to construct an image of the received incoming radiation.

20 Claims, 2 Drawing Sheets

SUPER-RESOLUTION MODAL IMAGING

TECHNICAL FIELD

The present disclosure relates to super-resolution modal imaging.

BACKGROUND

Direct imaging can be executed by using a series of lenses or mirrors defining an aperture to focus an image on a plane, and then measuring or recording the local intensity or power of the radiation on that plane. As consequence of the classical limits of this type of imaging system, i.e. the Rayleigh Criterion has led to a plethora of large diameter observatories in the quest of higher and higher resolution astronomy.

It has been shown that super-resolution may be achieved through the use of various other techniques. Some of these techniques include applying incident coherent radiation to the target, employing metamaterial lenses, nanolithographic structures, or, in the case of microscopes, using fluorescence radiation manipulations. As a consequence, the long-held Rayleigh Criterion may be a mere limitation of the direct imaging technique.

In direct imaging, photon counting on a 2D plane can be executed in a localized position array of detectors such as in a charge coupled device (CCD). An obvious limitation of this technique is its failure to utilize the phase information of the incoming radiation, and thus information is lost in the image.

DETAILED DESCRIPTION

Figure 1:
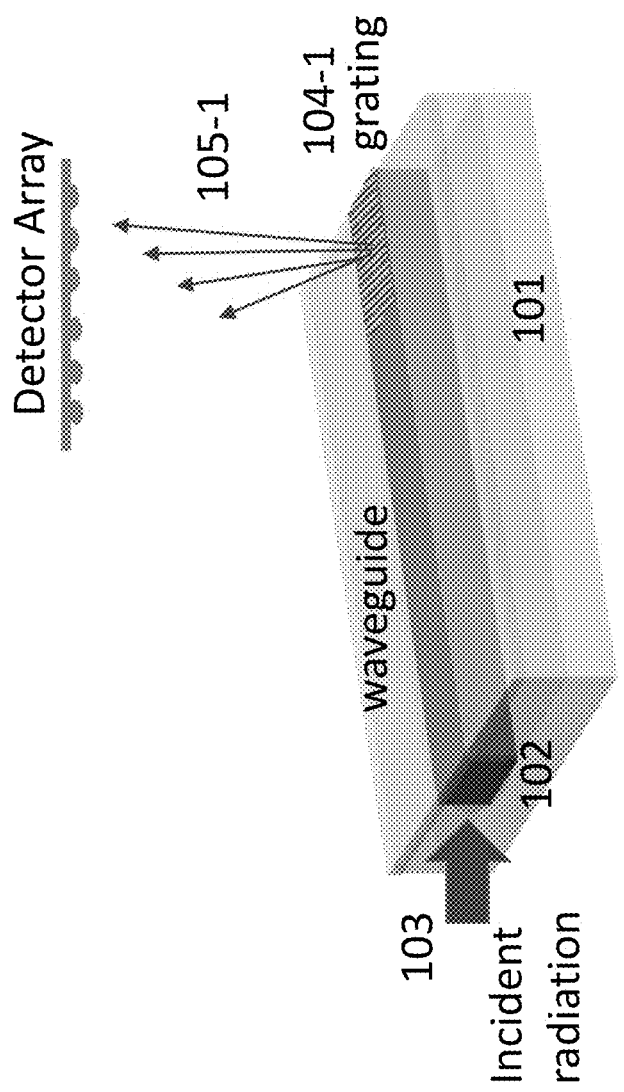
FIG. 1 illustrates a single linear grating for use in a modal imaging system in accordance with one or more embodiments of the present disclosure. An array of waveguides may be fabricated as well, in some embodiments.

As discussed above, direct imaging suffers from limited resolution due to the Rayleigh Criterion. Utilizing an alternative method of imaging, as discussed in the present disclosure, can provide a technique to achieve vastly improved quantum limited resolution of an image for a given aperture dimension and image intensity. The apparatuses and techniques described herein successfully image targets emitting or reflecting incoherent radiation and thus are well suited to the imaging of distant objects.

The Rayleigh criterion states that the finite dimensions of the optical aperture, D, induces diffraction patterns which limit the angular resolving power of the system. In the case of two separate distant physical objects the angular limit of resolution is given by $\theta=1.22\lambda/D$. However, in modal imaging, if photon counting can be executed on a mode by mode basis instead of in a position basis, the resolution of the system may become quantum limited.

The present disclosure may have broad applications to the imaging field in implementations whereby radiation can, for example, be collected through an aperture, focused and collimated through various optical components, and coupled into a mode confining structure, such as a waveguide or fiber. As such, it can improve a wide variety of imaging apparatuses whereby a direct imaging approach could be taken (e.g., focusing radiation on an image plane whereby the radiation intensity/power is recorded).

The present disclosure provides methods and apparatuses by which complex sources may be imaged. In previous approaches, only the distance between two point sources could be determined. However, the embodiments of the present disclosure can provide methods and apparatuses by which the movements of an N point source image may be determined. A source image can be derived from imaging of the incoming radiation which enters the apparatus through the aperture/lens.

The present disclosure provides a description whereby full imaging may be realized based upon using a mechanism (e.g., a photonic lantern or an optical grating) to separate the incoming radiation into its modes. A mode in this context can be considered a description of the spatial confinement of one of the system's energy states.

This disclosure also provides a description whereby super-resolution modal imaging may be achieved through an apparatus having an optical component that receives incoming radiation. The apparatus also includes a mode separating structure for separating the received incoming radiation into modes, an input imaging array, at least one output array, and at least one detector array having multiple array elements for measuring energy levels of each mode to construct an image of the received incoming radiation.

In some embodiments, the input imaging arrays and/or output arrays can be comprised of grating elements. The output arrays with grating elements can, for example, direct energy to a detector array having multiple array elements for measuring an energy level of each mode to construct an image of the received incoming radiation.

The apparatus can, in some embodiments, also include an input fiber for collecting received radiation from the optical component. These and other components will be discussed in more detail herein.

Similarly, the present disclosure includes method embodiments for super-resolution modal imaging. One method embodiment includes, receiving incoming radiation with an optical component, separating the incoming radiation into multiple modes using an array of gratings, routing each mode of radiation through a waveguide from input imaging array elements to output array elements, and directing the radiation from the output array elements to one or more detector array elements. In this manner, incoming radiation can be imaged and resolved at a much higher resolution than could be accomplished previously.

To understand modal imaging, it is useful to describe radiation reflected or emitted from a target arising from many independent incoherent point sources. Each point source generates a Poisson distribution in terms of its photon number and, thus, its energy distribution.

Electromagnetic energy can be defined by these modes which are simply eigensolutions to the propagation equations. Measuring and mapping the electromagnetic energy in a two dimensional modal basis (q,r) forms a composite of Poisson distributions across the space.

To derive this modal expression in an imaging device (e.g., a telescope) of aperture, D, first we start with the analysis used in conventional imaging. The density operator for a photon associated with a location $(x_l, y_m)$ on an image plane is given by:

$$\rho = (1-\varepsilon)|vac\rangle\langle vac| + \varepsilon(|\psi(x+x_l, y+y_m)\rangle\langle\psi(x+x_l, y+y_m)|)$$

$$|\psi(x,y)\rangle = \int_{-\infty}^{\infty} dx \int_{-\infty}^{\infty} dy\, \psi(x,y)|x,y\rangle$$

$$\psi(x,y) = \left(\frac{1}{2\pi\sigma_x\sigma_y}\right)^{1/2} \exp\left(-\frac{x^2}{\sigma_x^2} - \frac{y^2}{\sigma_y^2}\right)$$

where the incoming photon rate (including system loss) is less than the coherence time of the detectors, $\varepsilon \ll 1$ and the terms $O(\varepsilon^2)$ and higher are neglected. Thus, the technique can be particularly applicable to distant faint objectives, the resolution of which is often limited by the Rayleigh Criterion.

A Gaussian point spread function (PSF) can be used to model the effect of the objective aperture for this analysis. The dispersion is wavelength, $\lambda$, dependent given by $\sigma_x = \sigma_y \sim 2f\lambda/D$ where D is the diameter of an optical component (e.g., an objective mirror in a telescope) with focal length f. Directly imaging the radiation on a focal plane is given by the following expression which generates the conventional Rayleigh limited image.

$$I = (|\psi(x+x_l, y+y_m)\rangle\langle\psi(x+x_l, y+y_m)|)^2$$

In modal imaging, the radiation captured by the imager's aperture (e.g., telescope) can be collimated into a multimode fiber instead of being focused on a focal plane array. In such implementations, this maps the incoming radiation onto a Hermite-Gaussian basis, indicative of modes in a fiber.

$$|\phi_{q,r}\rangle = \int\int dx\,dy\, \phi_{q,r}(x,y)|x,y\rangle$$

$$\phi_{q,r}(x,y) = \left(\frac{1}{2\pi\sigma_x\sigma_y}\right)^{1/2}\left(\frac{1}{2^{q+r}q!r!}\right)^{1/2} H_q\left(\frac{x}{2\sqrt{\sigma_x}}\right)H_r\left(\frac{y}{2\sqrt{\sigma_y}}\right)e^{-\frac{x^2}{4\sigma_x^2}-\frac{y^2}{4\sigma_y^2}}$$

The function $H_q(x)$ refers to the physicist Hermite polynomial. The total energy of the photons is dispersed across the qth and rth modes. The collective modal surface is given by:

$$S(q,r) = \sum_{l=1}^{L}\sum_{m=1}^{M} n_{l,m}(|\langle\phi_{q,r}(x,y)|\psi(x-x_l, y-y_m)\rangle|^2)$$

which can be shown to reduce to a summation of Poisson distributions $$S(q,r) = \sum_{l=1}^{L}\sum_{m=1}^{M} n_{l,m} p_{Q_l}(q) p_{R_m}(r) = \sum_{l=1}^{L}\sum_{m=1}^{M} n_{l,m} \frac{1}{q!r!} e^{-Q_l} e^{-R_m} Q_l^q R_m^r$$

$$Q_l = \frac{x_l^2}{4\sigma_x^2} \quad R_m = \frac{y_m^2}{4\sigma_y^2}$$

where the coefficient $n_{l,m}$ is indicative of each Poisson's photon population and the mean of each distribution $Q_l$, $R_m$ is given by the maximum likelihood expressions:

$$\hat{Q}_l = \sum_{q=0}^{J\,modes} q\, m_{q,r} = \frac{x_l^2}{4\sigma_x^2} \quad \hat{R}_m = \sum_{r=0}^{K\,modes} r\, m_{q,r} = \frac{y_m^2}{4\sigma_y^2}$$

The photon number $m_{q,r}$ is the collective number of counts from each (q,r) mode counter. The fabrication section of this disclosure will discuss the physical collection of this modal surface.

Next an image reconstruction technique must distinguish each of the individual Poisson parameters $(n_{l,m}, Q_l, R_m)$ in the composite modal graph. To do this deterministically, we will ultimately employ a transform, but first a modified Gram Schmidt process is used to establish an orthonormal basis $\xi_l(q)$, $\chi_m(r)$ from the space that $p_{Q_l}(q)$ and $p_{R_m}(r)$ span.

$$S(q,r) = \sum_{l=1}^{L}\sum_{m=1}^{M} \alpha_{l,m}\xi_l(q)\chi_m(r)$$

Then, the $\alpha_{l,m}$ coefficients may be computed from the measured $S(q,r)$ surface via a transform:

$$\alpha_{l,m} = \sum_{q=1}^{J\,modes}\sum_{r=1}^{K\,modes} S(q,r)\xi_l(q)\chi_m(r)$$

The $n_{l,m}$ coefficients are uniquely determined by expanding the $\xi_l$ and $\chi_m$ terms of the $p_{Q_l}$ and $p_{R_m}$ and equating coefficients to the corresponding $n_{l,m}$ term.

$$S(q,r) = \sum_{l=1}^{L}\sum_{m=1}^{M} \alpha_{l,m}\xi_l(q)\chi_m(r) = \sum_{l=1}^{L}\sum_{m=1}^{M} n_{l,m} p_{Q_l}(q) p_{R_m}(r)$$

Specifically matrices A and B must be generated such that $$p_{Q_l}(q) = \xi_l(q)A \quad p_{R_m}(r) = \chi_m(r)B$$

It can be then determined that $$n = \xi[A^T]^{-1}\xi^T S[B]^{-1}\chi^T$$

To generate the full image, the intensity $n_{l,m}$ photons (number of photons) are then mathematically assigned to the corresponding $(x_l, y_m)$ location associated with that particular Poisson's average $(Q_l, R_m)$ per the maximum likelihood estimators as shown below.

$$\hat{Q}_l = \frac{x_l^2}{4\sigma_x^2} \quad \hat{R}_m = \frac{y_m^2}{4\sigma_y^2}$$

Up to this point, the discretization of the L×M matrix of $(x_l, y_m)$ values had not been explicitly defined. These values can be calculated using image reconstruction algorithms.

The resolution of the image can be determined by the signal-to-noise ratio (SNR) of the optics path to include the total number of photons $\Sigma n_{l,m}$ collected (a function of acquisition time), the system path loss, and detector efficiency. Basic statistics can form a bound of the resolution of this imaging process. The standard deviation of the mean can be defined as:

$$\sigma_{Ql} = \frac{\sqrt{Q_l}}{\sqrt{n_{lm}}} \quad \sigma_{Rm} = \frac{\sqrt{R_m}}{\sqrt{n_{lm}}}$$

Thus, the error in $x_l$ and $y_m$ (the location of $n_{lm}$ photons) can be defined as:

$$\varepsilon_x = \sqrt{4\sigma_x^2} \frac{1}{2} Q_l^{-1/2} \sigma_{Ql} = \frac{\sigma_x}{\sqrt{n_{lm}}} \quad \varepsilon_y = \frac{\sigma_y}{\sqrt{n_{lm}}}$$

The error is still related to the aperture dimension, $\sigma_x = \sigma_y \sim 2f\lambda/D$ but dramatically reduced by $n_{lm}$, the number of photons collected over some time interval. In such an embodiment, to achieve, for example, an angular resolution, $\alpha_{res}$, it would be necessary to resolve a spacing of $I_{res} = f \tan(\alpha_{res}/2)$ on the objective image plane (although this plane is never physically realized).

Thus, the error in the modal imager is calculated to be a $2\varepsilon < I_{res}$. The variance in $n_{lm}$ is representative of the intensity across the image, (assume for now the average value across the object of interest). This becomes a matter of photon acquisition time.

To estimate this, a few quantities must be defined. Any image will possess some total number of mode pairs that have non-zero photon counts, $\Omega$. For example, from simulations, it has been observed that a reasonably complex object might possess $\Omega \sim 3600$ to yield an average measured photon count per mode, $\langle n \rangle$.

Detector inefficiency must also be considered, encompassing both the mode demultiplexer efficiency and the photon detector efficiency.

From these quantities we can estimate the required acquisition time to achieve the required resolution given the photon rate, $\Gamma$, and the aperture diameter D.

$$N_{photons} = \Gamma_{photonrate} t_{image} = \sum_{l=0}^{L} \sum_{m=0}^{M} n_{l,m} \quad \langle n \rangle_{modes} = eff * \frac{N_{photons}}{\Omega_{max}}$$

$$2\varepsilon_x = 2\frac{\sigma_x}{\sqrt{\langle n \rangle}} = \frac{4f\lambda}{D\sqrt{eff\frac{\Gamma t_{image}}{\Omega_{max}}}} \leq I_{res} =$$

$$f \tan\left(\frac{\alpha_{res}}{2}\right) \Rightarrow t_{image} \geq \frac{4f\lambda}{D^2 eff \frac{\Gamma}{\Omega_{max}} f^2 \tan^2\left(\frac{\alpha_{res}}{2}\right)}$$

Apparatuses for providing such modal imaging techniques are discussed in detail below. Accordingly, in the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized, and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things, while "a plurality of" something can refer to more than one such things. For example, "a number of components" can refer to one or more components, while "a plurality of components" can refer to more than one component.

To realize the modal surface, the incoming radiation beam must be separated by mode pair (q,r). Mode demultiplexing is an intense area of research and has been demonstrated for use in the fields of silicon photonic integrated circuits, quantum computing, as well as in astrophotonics. The figures provided herein illustrate an embodiment of how such a system could be designed to provide mode demultiplexing and image capture.

FIG. 1 illustrates a single linear grating for use in a super-resolution modal imaging system in accordance with one or more embodiments of the present disclosure. The waveguides and gratings may be arrayed. In FIG. 1, the system 100 includes a substrate 101, an input imaging waveguide array 102 for receiving radiation 103, and one or more output gratings 104-1, 104-N for directing output energy 105-1, 105-N to one or more detectors, which capture energy components of the incoming radiation. In some embodiments, the input imaging array and the output imaging array can both be contained in the substrate.

Similarly to the discussion of the use of "a" and "one or more" as used herein with respect to single shown items, the variable "N" is used to indicate that, where multiple items are shown in an example, there can be any number of such items and not just the number of items shown in the example. For example, in FIG. 1, a single output array is shown, but embodiments of the present disclosure can have multiple outputs.

As referred to herein, the term "input imaging array" may also be described as a "modal imaging array". The input imaging array can, for example, be comprised of grating elements and can also be referred to as an "input grating array".

Figure 2:
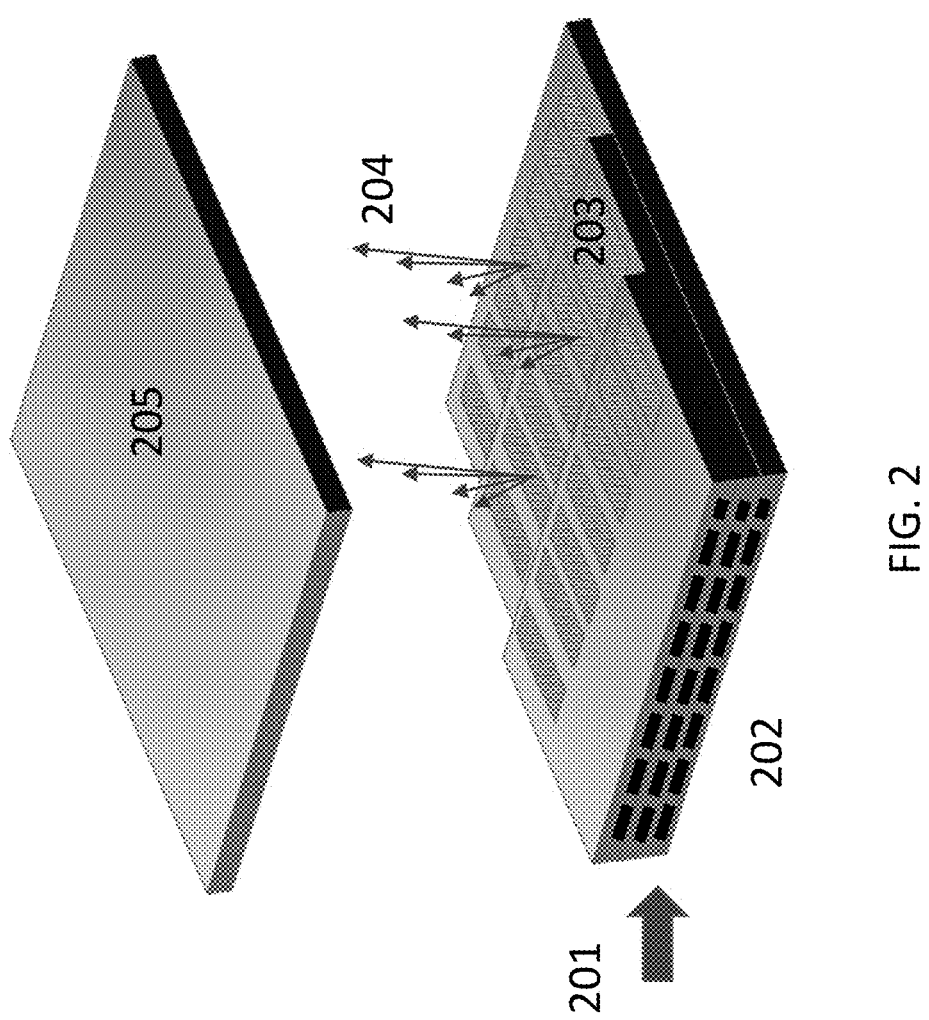
FIG. 2 illustrates an imaging array for use in a modal imaging system in accordance with one or more embodiments of the present disclosure.

FIG. 2 illustrates an imaging array for use in a super-resolution modal imaging system in accordance with one or more embodiments of the present disclosure.

The input radiation (201) is focused on the collection aperture (202) which is an array of the ends of waveguides. Each waveguide ends in a grating (203) which disperses the modes at different angles (204) and is captured by an array of photodetectors (205).

To detect the amount of energy in each mode the gratings project the energy back out of the wafer and into an appropriate detector array. The appropriate detector array can be determined by the magnitude and wavelength of the radiation considered.

Detectors may range from the exotic, such as a superconducting nanowire single photon detector (SNSPD), to conventional optical and IR photon detector semiconductor technologies, such as an avalanche photo diode (APD). Mid-wave infrared detectors (MWIRs) can also be used. In various embodiments, one detector may be required for each mode pair (q,r).

Through use of such embodiments, radiation directed through an aperture can be imaged at a super-resolution. Such advancements will enable significant improvements in imaging devices from microscopes to telescopes, among other aperture-based devices.

Although specific embodiments have been illustrated and described herein, those of ordinary skill in the art will appreciate that any arrangement calculated to achieve the same techniques can be substituted for the specific embodiments shown. For example a photonic lantern may be used to spatially demultiplex the modes instead of the apodized grating. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

What is claimed:

1. A quantum resolution modal imaging device, comprising:
    an aperture provided to receive incoming radiation;
    a mode confining structure;
    a mode separating structure; and
    at least one detector array having multiple array elements for measuring an energy level of each mode to construct an image of the received incoming radiation.

2. The device of claim 1, wherein the detector captures energy components of the incoming radiation.

3. The device of claim 1, wherein the device further includes an input imaging array.

4. The device of claim 1, wherein the device further includes an output array.

5. The device of claim 1, wherein the device further includes an input imaging array and an output array.

6. The device of claim 1, wherein one or more optical waveguides connect elements of an input imaging array to elements of an output array.

7. The device of claim 1, wherein the mode separating structure is configured to separate the received incoming radiation into multiple modes.

8. The device of claim 1, wherein an output array is comprised of grating elements.

9. A super-resolution imaging device, comprising:
    an aperture provided to receive incoming radiation;
    a mode separating structure for separating the received incoming radiation into multiple modes; and
    at least one output array with grating elements for directing energy to a detector array having multiple array elements for measuring an energy level of each mode to construct an image of the received incoming radiation.

10. The device of claim 9, wherein the aperture includes a lens.

11. The device of claim 9, wherein an input fiber that receives the radiation collected from the aperture.

12. The device of claim 9, wherein the device further includes an input imaging array.

13. The device of claim 12, wherein the input imaging array is an array of grating elements.

14. The device of claim 9, wherein the detector is a mid-wave infrared detector.

15. A quantum resolution modal imaging method, comprising:
    receiving incoming radiation with an optical component;
    separating the incoming radiation into multiple modes;
    routing each mode of radiation through a waveguide from input imaging array elements to output array elements; and
    directing the radiation from the output array elements to one or more photon detector array elements.

16. The method of claim 15, wherein separating the incoming radiation into multiple modes is accomplished using an array of gratings.

17. The method of claim 15, wherein the radiation is transferred through an optical waveguide from an input array element to an output array element.

18. The method of claim 15, wherein the one or more photon detector array elements are positioned upon the output arrays.

19. The method of claim 15, wherein the radiation is projected from the output array to one or more external detector arrays.

20. The method of claim 18, wherein the magnitude and wavelength of the radiation determine which photon detector array element the radiation is directed to.

* * * * *